United States Patent [19]
Ambrosio

[11] 3,831,119

[45] Aug. 20, 1974

[54] CREDIT CARD AND READER APPARATUS

[75] Inventor: Biagio F. Ambrosio, Woodland Hills, Calif.

[73] Assignee: Electronic Memories & Magnetics Corp., Los Angeles, Calif.

[22] Filed: Dec. 14, 1972

[21] Appl. No.: 315,129

[52] U.S. Cl.............235/61.11 A, 235/61.7 B, 235/61.12 C
[51] Int. Cl................ G06k 7/06, G06k 19/06
[58] Field of Search...235/61.7 B, 61.12 C, 61.12 N, 235/61.12 R, 61.11 A; 200/46; 101/93 C

[56] References Cited
UNITED STATES PATENTS

| | | | |
|---|---|---|---|
| 1,165,663 | 12/1915 | Goldberg | 235/61.11 A |
| 1,478,691 | 12/1923 | Bagge | 235/61.12 C |
| 2,964,734 | 12/1960 | West | 235/61.12 N |
| 3,485,168 | 12/1969 | Martinson | 235/61.12 N |
| 3,708,654 | 1/1973 | Booth et al. | 235/61.11 A |

Primary Examiner—Daryl W. Cook
Attorney, Agent, or Firm—Lindenberg, Freilich, Wasserman, Rosen & Fernandez

[57] ABSTRACT

A simple credit card and reader apparatus, including a card with insulative outer layers and with an electrically conductive inner layer that is exposed to form numerals, and a reader having static electrical contacts that engage the numeral-forming areas of the conductive card layer. The reader includes a signal generator that passes current into the conductive layer of the card, and a circuit that senses current picked up by the contacts to transmit signals representing the card numerals over a telephone line to a central receiving station.

4 Claims, 8 Drawing Figures 3,831,119

CREDIT CARD AND READER APPARATUS

BACKGROUND OF THE INVENTION

This invention relates to credit cards and the credit card reader apparatus.

Store clerks must often verify credit cards to determine whether to permit purchases with them. Such verification generally has required that the clerk telephone a verification center and read the card number to a clerk thereat. This task is often annoying and time consuming. Automatic character-reading devices can be readily constructed, but they generally are too expensive to permit installation at low to medium volume sales counters.

SUMMARY OF THE INVENTION

In accordance with one embodiment of the present invention, a credit card and reader are provided which can be produced at low cost, wherein the reader automatically transmits signals identifying credit card numbers over a telephone line. The credit card includes a middle layer of electrically conductive material sandwiched between layers of insulative material, and the card is embossed to form raised numerals and a raised common area. Areas of the insulative upper layer are removed over the raised areas, so that the conductive middle layer is exposed thereat. The reader includes stationary electrical contacts that can engage the middle layer at the raised and exposed regions. Current is passed into the middle layer through the common area, so that a current flows from the middle layer into all of the reader contacts which touch a raised middle layer region. The reader has a set of seven small contacts at each location that corresponds to a raised numeral on the card, so that the numeral can be identified by noting which of the seven contacts receive current. The reader senses the current on all of the sets of contacts and transmits signals over a telephone line to a central station corresponding thereto, so that equipment at the central station can identify the credit card number.

The reader is provided with a printer which prints the credit card number on a customer receipt. The printer portion includes apparatus for holding a receipt which includes material that darkens where current has passed. Printer contacts that press against the receipt are connected to the character-reading contacts that engage the card to receive printing current. Thus, at the same time as the card is being read, the numerals are automatically printed on a receipt.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
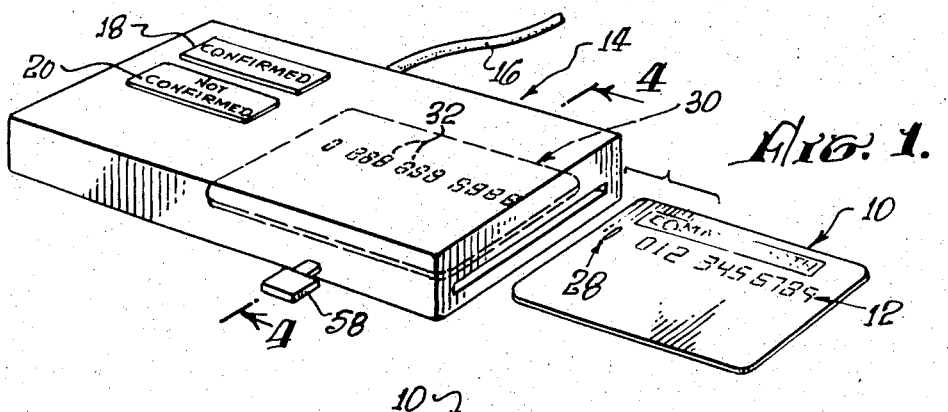
FIG. 1 is a perspective view of a card and reader constructed in accordance with the present invention.
Figure 2:
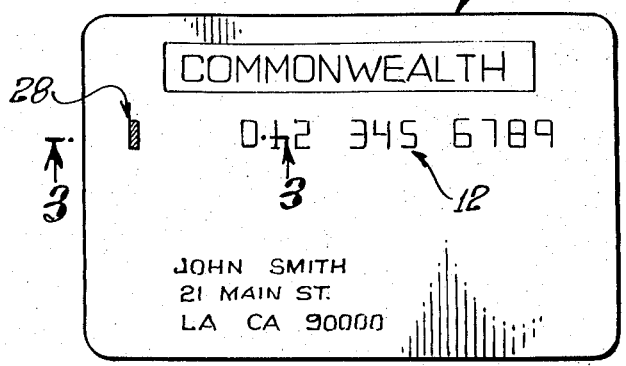
FIG. 2 is a plan view of the credit card of FIG. 1.
Figure 3:
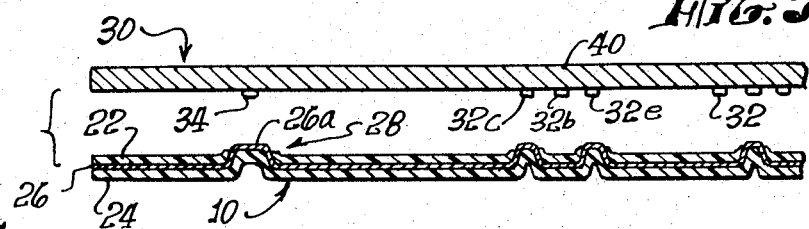
FIG. 3 is a sectional view taken on the line 3—3 of FIG. 2, and also showing a portion of the reader.

FIG. 1 illustrates a credit card 10 which bears an identifying credit card number 12, and a card reader 14 which is designed to receive and read the card. The reader 14 has a cable 16 designed for connection to a telephone station to transmit signals that identify the credit card number. A central station which is also connected to the telephone line compares the credit card number with a list of numbers which it maintains, to determine whether or not a particular purchase is authorized on that credit card. The central station sends signals to the reader 14 which cause either of two indicators 18, 20 thereon to light-up. A sales person will complete the sale only if the "confirmed" indicator 18 is illuminated.

As also illustrated in FIGS. 2–5, the credit card 10 is a laminate which includes upper and lower layers 22, 24 of electrically insulative material such as a common plastic, and a middle layer of electrically conductive material such as a metal. The card sandwich is embossed to form raised characters that define the card number 12. In addition, the card is embossed at a common contact region 28. The upper layer 22 is removed at each embossed location, so that the electrically conductive middle layer 26 is raised and exposed thereat. Thus, at the common contact region 28, the middle layer portion 26a thereat is raised and is exposed through apertures formed in the upper layer.

The exposed and raised areas that form the common contact region and the character-defining regions are interconnected through the rest of the middle layer 26. These exposed regions permit readout of the card by a simple reader that makes direct electrical contact with the card. The reader 14 includes a contact assembly 30 that includes numerous electrical contacts 32 that can contact the raised and exposed regions of the middle card layer 26. The contact assembly also includes a common contact 34 which can engage the common contact area 26a on the card to pass current into the middle layer 26 thereof. The other contacts 32 of the assembly are character-detecting contacts that engage the raised card portions that define the numerals 12. Each of the character-detecting contacts 32, such as contact 32c which can engage the raised card portion 26c, receive current which has flowed into the middle layer through the common contact 34. Thus, when the card is pressed against the contact assembly 30, a current will appear on all of the contacts 32 which engage a raised card portion that defines part of the card number.

Figure 5:
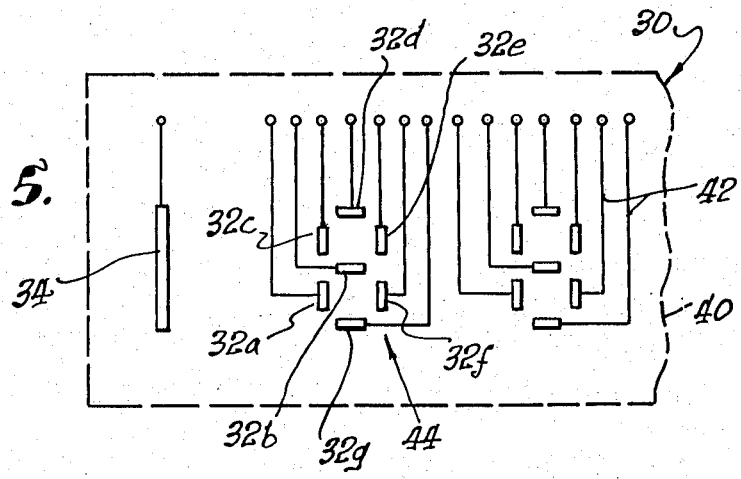
FIG. 5 is a partial view taken on the line 5—5 of FIG. 4.

The contact assembly 30 includes a substrate 40 which supports the common and character-detecting contacts 34 and 32 and which also supports conductive strips 42 that extend to the contacts. The character-detecting contacts are arranged in groups of seven, as illustrated in FIG. 5. A first set 44 of seven contact is designed to read the first numeral of the card. This set of contacts 44 include three contacts that are vertically spaced (where the top and bottom of the card or of the contact assembly are considered vertically spaced), these being the contacts 32d, 32b, and 32g. The set also includes an upper pair of laterally spaced contacts 32c and 32e lying at a height between the heights of the contacts 32d and 32b, and a pair of laterally spaced lower contacts 32a and 32f lying at a height between contacts 32b and 32g. This group of seven contacts can identify any of the ten digits which have the form illustrated in FIG. 2. Thus, when the card 10 is moved against the contact assembly 30, the first set of contacts 44 will identify the numeral 0 by the fact that all of the contacts except contact 32b receive current.

Figure 4:
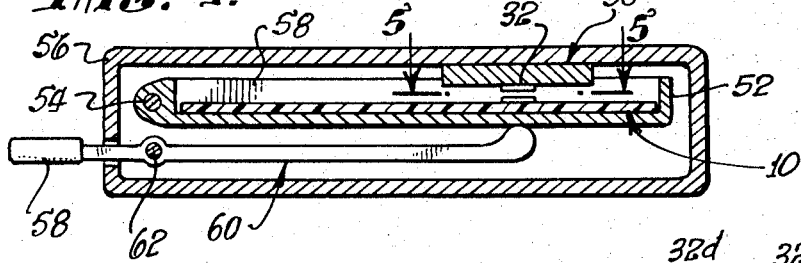
FIG. 4 is a sectional view taken on the line 4—4 of FIG. 1, with the card fully inserted into the reader.

The card 10 is read in the reader 14 by inserting the card through a slot 50. As illustrated in FIG. 4, the card 10 is held on a platform 52 that is pivotably mounted at 54 on the housing 56 of the reader. The card 10 is inserted until it hits a far wall 58 on the platform. The operator then depresses a button 58 that is formed at the end of a lever 60 that is pivotably mounted at 62 on the housing. The lever moves up the platform 52 so that the raised areas of the card 10 engage the contacts 32 on the contact assembly 30. The reader then passes current into the common contact area of the card and senses current received on all of the character-reading contacts, to generate signals that define the card number.

Figure 6:
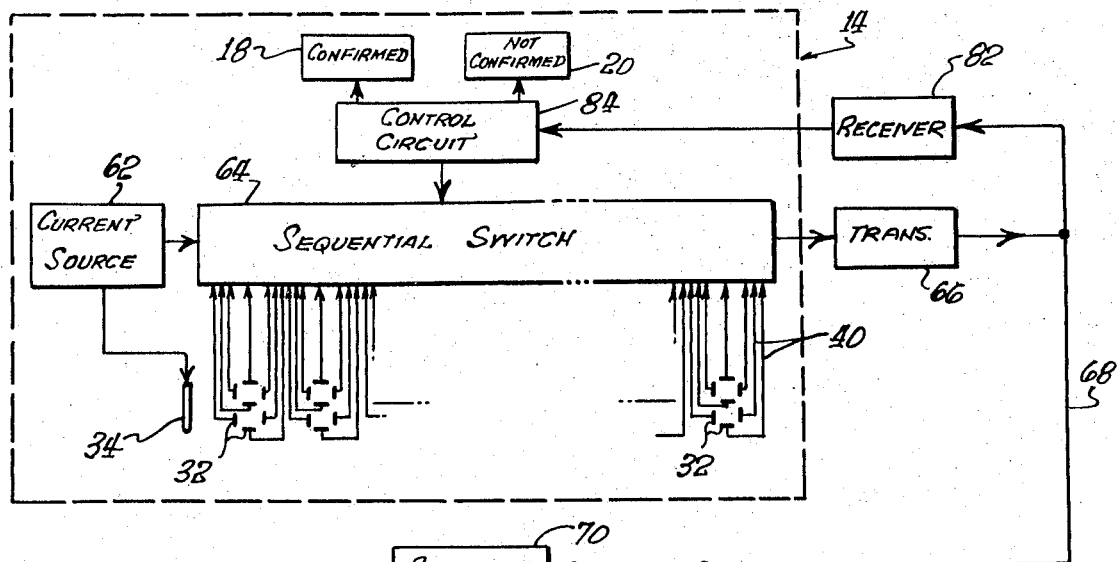
FIG. 6 is a block diagram of the reader of FIG. 1 and of a central station, the figure also showing a telephone communication link between them.

FIG. 6 illustrates a card certifying system which includes the reader 14 that generates signals representing a card number, a central station 60 that receives the number-identifying signals, and a telephone line that connects the reader and central station. The reader 14 includes a current source 62 that is connected to the common contact 34, to pass current into the card so that current will be received at all of the character-detecting contacts 32 that engage a raised card area. All of the character-detecting contacts 32 are connected through the lines 40 to a sequential switch 64. The sequential switch 64 is connected to the transmitter 66 of a telephone station which transmit signals over a telephone line 68.

The sequential switch 64 sequentially connects each of the lines 40 to the transmitter 66. Thus, in a reader which has ten sets of character-detecting contacts 32 for detecting ten numerals, the switch 64 will transmit seventy signals, each signal being a binary signal representing the output from one of the seventy contacts 32. Each of the contacts 32 may be connected to the transmitter for a very brief time, so that the transmission of all seventy signals can occur in a time period such as one-half second. Several transmitting cycles may be made in rapid succession to eliminate errors even though there may be noise on the telephone line. The signals pass through the telephone line 68 to a receiver 70 at the central office where the central station 60 is located.

The signals received at the central station 60 enter a temporary storage circuit 72 which delivers them into a comparator 74. The comparator 74 compares the card number with a list of card numbers held in a card number memory 76. The card memory 76 may hold the numbers of all cards for which card purchases are authorized. If the comparator 74 senses an exact match between the number in the temporary storage circuit 72 and one of the numbers in the card memory 76, then it sends a signal over line 78 that indicates that a purchase is authorized. Otherwise, the comparator 74 delivers a signal over line 78 that indicates the purchase is not authorized. The signals on line 78 pass through a telephone transmitter 80, through the telephone line 68 to a receiver 82 that is connected to the reader 14. The signal received by the receiver 82 enters a control circuit 84 of the card reader. This signal causes the control circuit to energize a lamp of one of the indicators 18, 20 to indicate to the store clerk whether the credit card purchase is authorized or not.

The circuit of FIG. 6 is, of course, highly simplified. The control circuit 84 may contain a clock that causes the sequential switch 64 to advance from one contact 32 to the next at predetermined intervals, as well as other circuits to initiate and repeat the switching cycle. Other circuits may be included to permit automatic dialing of the central station and to permit the central station to signal the reader when to begin the switching cycle. Instead of transmitting signals representing the current or signal on each of the seventy character-detecting contacts 32, it is possible to provide a circuit that generates a separate error-correcting code signal for each of the ten numerals. However, a simpler circuit generally can be constructed where all of the seventy contacts are merely sampled in sequence and the cycle is merely repeated several times to avoid errors. In some situations, signals representing the card number are not sent over telephone lines. Instead, a memory containing authorized or unauthorized credit card numbers can be attached directly to the reader, or may be located in the same store as the reader. In those cases, signals representing the card number may be transmitted in parallel over many connecting lines rather than serially through one telephone line.

Figure 7:
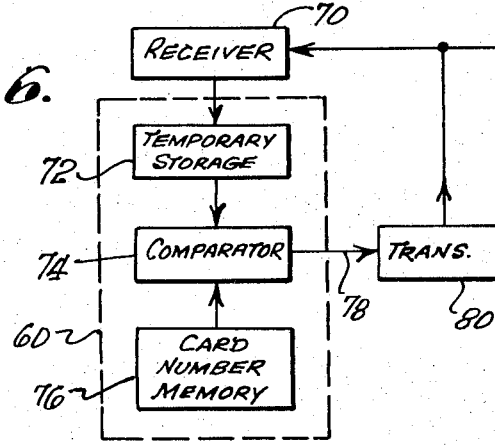
FIG. 7 is a partial sectional view of a combined reader and printer constructed in accordance with another embodiment of the invention.
Figure 7:
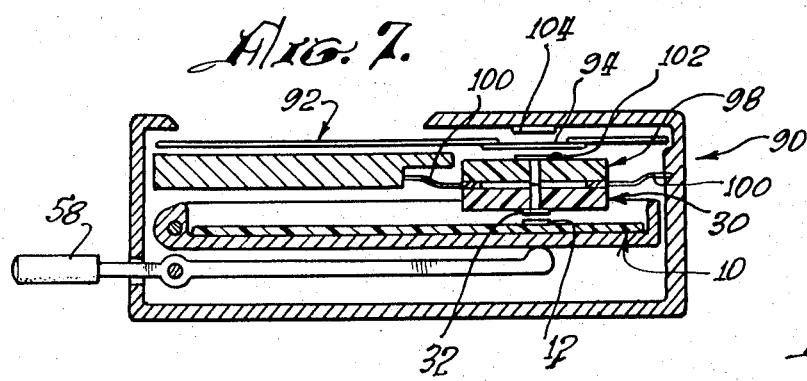
Figure 8:
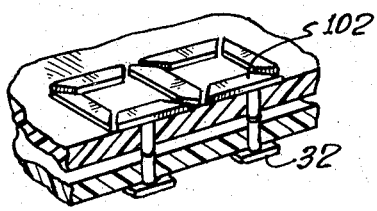
FIG. 8 is a partial perspective view of the reader of FIG. 7.

FIG. 7 illustrates a combined card reader and printer 90 constructed in accordance with another embodiment of the invention. This device is similar to the reader 14 of FIG. 1, except that it also prints the card number 12 on a receipt 92. The receipt 92 is a sheet (which may be part of a long roll) that includes a strip 94 of electrolytic material that can change color when current passes through it. The apparatus includes a contact assembly 96 and a printer assembly 98 that are joined together and flexibly supported by a pair of leaf springs 100. The print assembly 98 includes printing electrodes 102 which may be of a material such as silver that deposits on electrolytic paper, and the printing electrodes are connected to the contacts 32 that engage the card. In addition, a backing electrode 104 is provided which lies on a side of the print-receiving strip 94 opposite the printing electrodes 102. When the printing electrodes 102 are pressed upwardly against the strip 94, and current is received by the contacts 32, the current passes from the printing electrodes 102 through the strip 94 to the backing strip 104. This current darkens areas of the strip 94 to form an image thereon.

In order to print on the strip 94, a clerk inserts the card 10 into the machine and depresses the knob 58. This raises the card against the contact assembly 30, moving it and the print assembly 98 upwardly to press the print-receiving strip 94 against the backing electrode 104. When current is then applied to the conductive layer of the card through the common contact area 26a thereof, current flows through some of the character-detecting contacts 32 and through corresponding printing electrodes 102, and through the print-receiving strip 94 to the backing electrode 104. A small portion of the current is also sensed by a sequential switch of the type shown at 64 in FIG. 6, to transmit signals over a telephone line. Thus, the card number is transmitted over a telephone line for verification at the same time as it is printed on a receipt. Printing can be accomplished by other techniques, such as with heat printing to discolor heat-sensitive paper by heating the raised numerals of the card or even the entire card.

Thus, the invention provides a simple card and card reader apparatus which permit automatic reading of card numbers and the transmission of signals representing the numbers over telephone lines to a central station for verification. The card may be constructed by the use of a conductive layer which is covered by an insulative layer except at selected regions which form the card number numerals. Of course, an all metal card also can be used, but it is generally more expensive to attractively decorate such a card. The reader includes static contacts which engage the card and therefore make electrical contact with the exposed areas of the conductive layer. The reader includes a current or signal generator that passes current through the conductive layer so that a current can be sensed at every contact which engages the conductive layer of the card. This can be accomplished by providing a common contact region where the conductive layer is exposed and which is present in all cards. Current enters this common contact area and leaves the card at the character-defining regions. Of course, it does not matter in which direction the current passes, and therefore it does not matter whether the current is assumed to flow from the positive terminal of the current source to the negative terminal thereof or vice versa. The current on the character-detecting contacts can be processed by a variety of circuits, including a sequential switch which delivers a binary signal representing the current level at each character-detecting contact in sequence. The reader also can be provided with a printing apparatus that prints the card number on a receipt using the same contacts that read the card to deliver signals over a telephone line.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A credit card comprising:
a card sandwich including upper and lower layers of electrically insulative material and an inner layer therebetween of electrically conductive material, said sandwich being embossed so local areas of the inner layer are raised, said sandwich being devoid of said upper layer over the local raised areas so that the inner layer is exposed thereat;
said local areas defining a plurality of characters and a common contact area.

2. The credit card described in claim 1 including:
a reader having a plurality of spaced electrical contacts, including a common contact and sets of character-detecting contacts, and having means for holding said card sandwich adjacent to said contacts, said contacts arranged so that said common contact engages said common contact area and said character-detecting contacts are positioned about each of said characters of the card sandwich; and
signal generating means for passing electrical currents into said common contact and out of said character-detecting contacts so that currents flow through the common area of the card sandwich and through unexposed regions of the inner layer of the card sandwich and through raised local areas of the card sandwich which define characters.

3. The credit card described in claim 1 including:
a printer including means for holding a sheet of print-receivable stock, means for holding said card sandwich with each of said local areas that define characters electrically connected to predetermined locations on the stock, and means for passing electrical current into said common contact and out of said local card sandwich areas that define characters and through corresponding locations of the stock.

4. A printer for use with a card having electrically conductive locations defining characters comprising:
a plurality of spaced sets of character-detecting electrical contacts;
means for releasably holding a card adjacent to said contacts so that electrical connections are established between the contacts and electrically conductive card locations aligned therewith;
a plurality of printing contacts;
electrical conductor means for coupling each printing contact to a corresponding character-detecting contact;
means for holding a sheet of print-receivable stock against said printing contacts; and
current generating means coupled to said character-detecting contacts, for passing current through those character-detecting contacts that engage a conductive card location, and through corresponding printing contacts, whereby to apply current to the sheet of stock engaged by the printing contacts to electrically print thereon.

* * * * *